US010558514B2

(12) United States Patent
D et al.

(10) Patent No.: US 10,558,514 B2
(45) Date of Patent: Feb. 11, 2020

(54) ERROR HANDLING IN A CLOUD BASED HYBRID APPLICATION INTEGRATION

(71) Applicant: INTERNATIONAL BUSINESS MACHINES CORPORATION, Armonk, NY (US)

(72) Inventors: Manjunatha D, Bangalore (IN); Ramkumar Ramalingam, Theni (IN); Balaji Sankar, Bangalore (IN); Venumadhav Vanagondi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 15/803,920

(22) Filed: Nov. 6, 2017

(65) Prior Publication Data
US 2019/0138380 A1 May 9, 2019

(51) Int. Cl.
G06F 11/07 (2006.01)
(52) U.S. Cl.
CPC ........ G06F 11/079 (2013.01); G06F 11/0706 (2013.01); G06F 11/0751 (2013.01); G06F 11/0775 (2013.01); G06F 11/0787 (2013.01); G06F 11/0793 (2013.01)
(58) Field of Classification Search
CPC ............... G06F 11/0715; G06F 11/079; G06F 11/0793; G06F 11/0784; G06F 11/0706; G06F 11/0718; G06F 11/0775; G06F 11/0766
See application file for complete search history.

(56) References Cited

U.S. PATENT DOCUMENTS

| 5,594,861 A * | 1/1997 | Jonsson | G06F 11/0715 |
| | | | 714/2 |
| 6,223,227 B1 * | 4/2001 | Williamson | G06F 8/24 |
| | | | 719/315 |
| 6,466,992 B2 * | 10/2002 | Williamson | G06F 8/24 |
| | | | 719/315 |

(Continued)

OTHER PUBLICATIONS

Bhuyan et al., "A Novel Approach for Exception Handling in SOA," The Second International Conference on Computer Science, Engineering and Applications, Conference Paper: May 2012, Copyright CS & IT-CSCP 2012, pp. 425-433.

(Continued)

Primary Examiner — Nadeem Iqbal
(74) Attorney, Agent, or Firm — Jordan T. Schiller

(57) ABSTRACT

A computer-implemented method for error standardization in a cloud based hybrid application integration environment. The method includes receiving at least one error schema definition for an error type from a software application, and mapping the received at least one error schema definition with a corresponding error schema definition of at least one architecture style. The method includes generating an error mapping object based on the mapping of the received at least one error schema definition and the corresponding error schema definition of the at least one architecture style. The method further includes receiving an error object from the software application, and generating a resolved error object, for the received error object, based on the generated error mapping object.

20 Claims, 12 Drawing Sheets

(56) References Cited

U.S. PATENT DOCUMENTS

| | | | |
|---|---|---|---|
| 8,191,077 B2* | 5/2012 | Williamson | G06F 8/24 |
| | | | 719/313 |
| 8,667,508 B2* | 3/2014 | Williamson | G06F 8/24 |
| | | | 719/316 |
| 8,732,668 B2 | 5/2014 | Klemenz et al. | |
| 9,069,665 B2* | 6/2015 | Murphy | G06F 11/0709 |
| 9,298,535 B2* | 3/2016 | Haines | G06F 11/0766 |
| 9,301,185 B1* | 3/2016 | Koller | H04W 24/10 |
| 9,582,598 B2 | 2/2017 | Kalgi | |
| 9,732,668 B2* | 8/2017 | Hodebourg | F02B 37/183 |
| 9,760,343 B2 | 9/2017 | Noens | |
| 9,891,982 B2 | 2/2018 | Johnson | |
| 10,204,004 B1* | 2/2019 | Shamis | G06F 11/327 |
| 10,210,033 B2* | 2/2019 | Kim | G06F 11/0727 |
| 2006/0129880 A1* | 6/2006 | Arcese | G06F 11/3672 |
| | | | 714/11 |
| 2012/0222048 A1 | 8/2012 | Bharathula | |
| 2015/0261595 A1 | 9/2015 | Murphy et al. | |
| 2017/0257432 A1 | 9/2017 | Fu | |

OTHER PUBLICATIONS

Mell et al., "The NIST Definition of Cloud Computing," National Institute of Standards and Technology, U.S Department of Commerce, Special Publication 800-145, Sep. 2011, pp. 1-7.

* cited by examiner

```
{
        "$schema": "http://json-schema.org/draft-04/schema#",
        "title": "Error",
        "http_code": 400,
        "description": "Bad Request",
        "type": "object",
        "properties": {
                "code": {
                        "description": "http status code",
                        "type": "integer",
                        "ReST": "statusCode",
                        "oData": "code"

},
                "message": {
                        "description": "Error message",
                        "type": "string",
                        "REST": "message",
                        "oData": "message"
                },
                "errors": {
                        "description": "Error details",
                        "type": "object",
                        "ReST": "errors",
                        "oData": "errors_message"
                }
        }
}
```

FIG. 3

```
{
  "$schema": "http://json-schema.org/draft-04/schema#",
  "title": "Error",
  "http_code" : 400,
  "description": "Bad Request",
  "type": "object",
  "properties": {
    "status": {
        "description": "http status code",
        "type": "integer",
        "ReST" : "statusCode",
        "oData" : "code"
    },
    "message": {
        "description":"Error message",
        "type": "string",
        "ReST" : "message"
        "oData" : "message"

```
{
 "statusCode" : "$error.code",
 "message" : "$error.message",
 "errors" : "$error.errors"
}
```

```
HTTP Header :
HTTP/1.1 400 Bad Request

HTTP Body

{
  "error": {
    "code": 400,
    "message": "The 'fields' parameter is required for this method.",
    "errors": [
      {
        "locationType": "parameter",
        "domain": "global",
        "message": "The 'fields' parameter is required for this method.",
        "reason": "required",
        "location": "fields"
      }
    ]
  }
}
```

FIG. 8

```
HTTP Header :
HTTP/1.1 400 Bad Request

HTTP Body

{
    "type": "error",
    "status": 400,
    "code": "conflict",
    "context_info": {
        "errors": [
            {
                "reason": "invalid_parameter",
                "name": "group_tag_name",
                "message": "Invalid value 'All Box '. A resource with value 'All Box ' already exists"
            }
        ]
    },
    "help_url": "http://developers.example.com/docs/#errors",
    "message": "Resource with the same name already exists",
}
```

FIG. 9

```
{
 "statusCode" : 400,
 "message" : "The 'fields' parameter is required for this method.",
 "errors" : [{
        "locationType" : "parameter",
        "domain": "global",
        "message": "The 'fields' parameter is required for this method.",
        "reason": "required",
        "location": "fields"
     }
   ]
}
```

ERROR HANDLING IN A CLOUD BASED HYBRID APPLICATION INTEGRATION

BACKGROUND

Embodiments of the present invention relate generally to standardizing error data objects, received by micro-services, from various enterprise applications, via application programming interfaces (APIs), within a cloud based hybrid application integration environment.

Micro-services need to interact with different enterprise applications, or other micro-services, to achieve their business goals. This means that multiple micro-services may need to interact with various APIs. Each API provider contains its own software code, perhaps in a computer programming language that is not in uniformity with other APIs. As a result, there may not be software code consistency across API providers, especially when it comes to error handling.

As a result, it is up to the micro-service to confront the myriad of potential error structures that could arise, and handle them accordingly. The software developer of a micro-service currently handles encountered error structures by attempting to standardize error handling across APIs. Standardizing error handling is not a trivial job, and requires a developer with in-depth knowledge of the application or micro-service to understand the myriad of potential error structures that could arise, and then to write software code to handle each one. This is a time consuming task, it is error prone, and requires the developer to do it all over again when there is some change made to each micro-service or application.

SUMMARY

Embodiments of the invention include a method, computer program product, and system, for error standardization in a cloud based hybrid application integration environment.

According to an embodiment, a method for error standardization in a cloud based hybrid application integration environment, wherein the method comprises receiving, by a micro-service, at least one error schema definition for an error type from a software application, wherein the at least one error schema definition for the error type includes at least one generic property name. The method further comprises mapping the received at least one error schema definition with a corresponding error schema definition of at least one architecture style, wherein the corresponding error schema definition of the at least one architecture style includes at least one architecture-specific property name. The method further comprises generating an error mapping object based on the mapping of the received at least one error schema definition and the corresponding error schema definition of the at least one architecture style. The method further comprises receiving an error object from the software application and generating a resolved error object, for the received error object, based on the generated error mapping object.

A computer program product, according to an embodiment of the invention, includes a non-transitory tangible storage device having program code embodied therewith. The program code is executable by a processor of a computer to perform a method. The method comprises receiving, by a micro-service, at least one error schema definition for an error type from a software application, wherein the at least one error schema definition for the error type includes at least one generic property name. The method further comprises mapping the received at least one error schema definition with a corresponding error schema definition of at least one architecture style, wherein the corresponding error schema definition of the at least one architecture style includes at least one architecture-specific property name. The method further comprises generating an error mapping object based on the mapping of the received at least one error schema definition and the corresponding error schema definition of the at least one architecture style. The method further comprises receiving an error object from the software application and generating a resolved error object, for the received error object, based on the generated error mapping object.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method comprises receiving, by a micro-service, at least one error schema definition for an error type from a software application, wherein the at least one error schema definition for the error type includes at least one generic property name. The method further comprises mapping the received at least one error schema definition with a corresponding error schema definition of at least one architecture style, wherein the corresponding error schema definition of the at least one architecture style includes at least one architecture-specific property name. The method further comprises generating an error mapping object based on the mapping of the received at least one error schema definition and the corresponding error schema definition of the at least one architecture style. The method further comprises receiving an error object from the software application and generating a resolved error object, for the received error object, based on the generated error mapping object.

BRIEF DESCRIPTION OF THE SEVERAL VIEWS OF THE DRAWINGS

FIG. 3 depicts an example error schema definition for "Bad Request" as defined by enterprise application #1, according to an embodiment of the present invention.

FIG. 4 depicts an example error schema definition for "Bad Request" as defined by enterprise application #2, according to an embodiment of the present invention.

FIG. 8 is an example of an error object code returned by an enterprise application in response to an invalid request, according to an embodiment of the present invention.

FIG. 9 is an example of an error object code returned by another enterprise application in response to an invalid request, according to an embodiment of the present invention.

DETAILED DESCRIPTION

Figure 1:
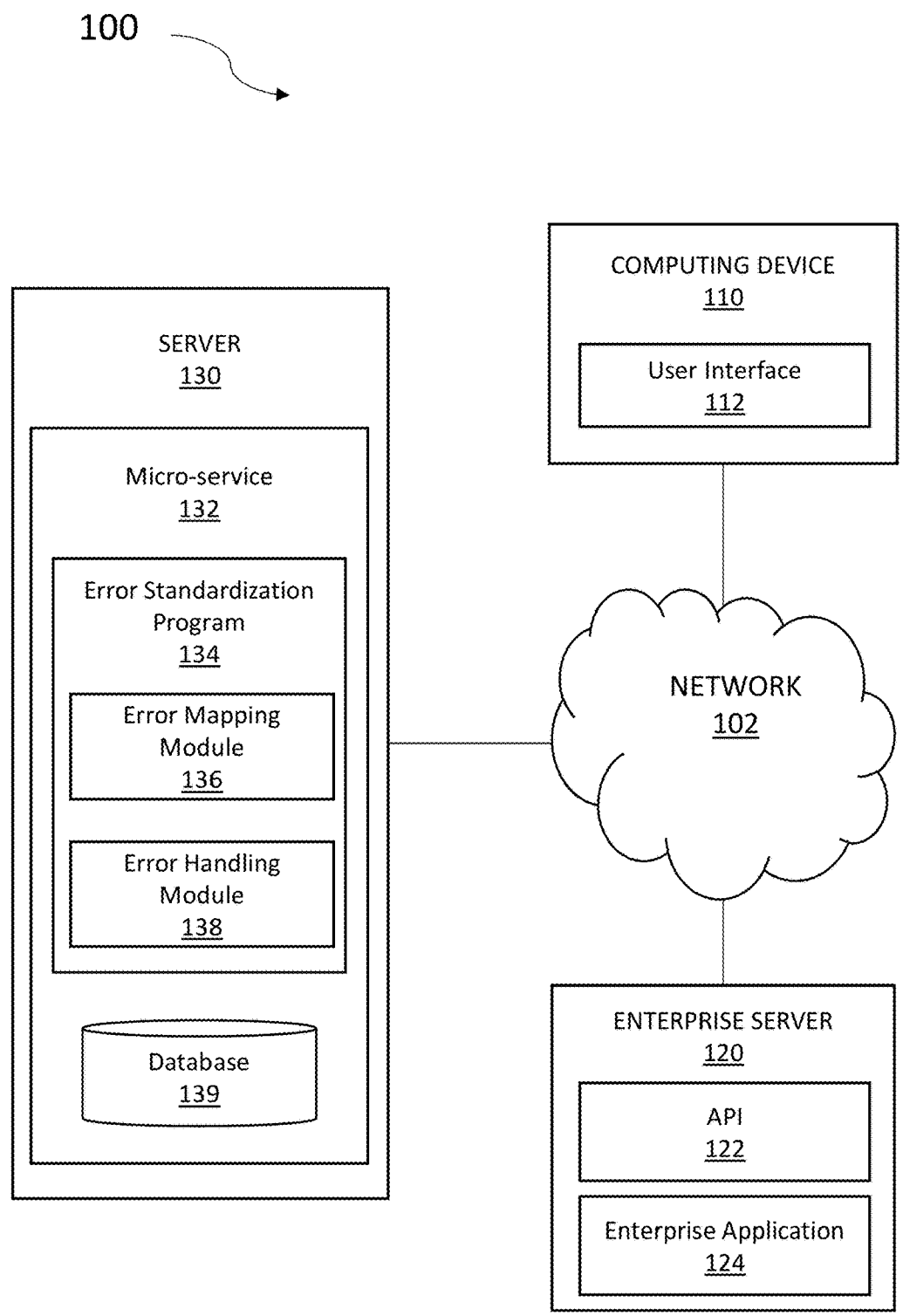
FIG. 1 illustrates a micro-service computing environment 100, according to an embodiment of the present invention.

Integration Platform as a Service (iPaaS) is a model of provisioning integration services as a standalone platform. iPaaS solutions can carry out a variety of integration patterns and provide a secure means of accessing the enterprise.

iPaaS solutions on cloud are adopting the micro-service architecture. Micro-services is an approach to application development where large software applications are developed as a suite of independently deployable, small, modular services in which each module service runs as unique process and communicates through a well-defined, light weight mechanism, such as various APIs, to serve the business goal.

An API is code that allows two software programs to communicate with each other. The API defines the correct way for a developer to write a software program that requests services from an operating system or other application. APIs may be implemented by function calls. APIs are made up of two related elements. The first is a specification that describes how information is exchanged between programs, done in the form of a request for processing and a return of the necessary data. The second is a software interface written to that specification and published in some way for use. The software that wants to access the features and capabilities of the API is said to call it, and the software that creates the API is said to publish it.

The present invention proposes a solution that enables enterprise applications to support an error schema definition via discovery, in a cloud based hybrid application integration environment. An error schema definition represents error object properties, for an application, along with the standard name specified in various architecture styles, such as Representational State Transfer (ReST), Open Data Protocol (oData), etc., so that the software developer can write generic code snippets which are capable of handling the errors returned by various enterprise applications during run-time, and can also interact with new applications without writing additional code.

The present invention may achieve numerous advantages over the current technology. For example, enabling enterprise applications to support an error schema definition via discovery: (1) removes endpoint specific code from the micro-service which results in effective decoupling of micro-services; (2) allows the consuming micro-service to hide underlying interactions with other micro-services and/or applications, which results in a better user experience; (3) lowers development and maintenance costs; (4) provides agility in adding support for new micro-services and/or applications, which in turn reduces time to market; and (5) enhances the user experience.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

FIG. 1 illustrates a micro-service computing environment 100, in accordance with an embodiment of the present invention. Micro-service computing environment 100 includes computing device 110, enterprise server 120, and server 130, all connected via network 102. The setup in FIG. 1 represents an example embodiment configuration for the present invention, and is not limited to the depicted setup in order to derive benefit from the present invention.

In the example embodiment, computing device 110 contains user interface 112. In various embodiments, computing device 110 may be a laptop computer, tablet computer, netbook computer, personal computer (PC), a desktop computer, a personal digital assistant (PDA), a smart phone, or any programmable electronic device capable of communicating with enterprise server 120 and server 130 via network 102. Computing device 110 may include internal and external hardware components, as depicted and described in further detail below with reference to FIG. 12. In other embodiments, computing device 110 may be implemented in a cloud computing environment, as described in relation to FIGS. 13 and 14, herein. Computing device 110 may also have wireless connectivity capabilities allowing it to communicate with enterprise server 120 and server 130, as well as other computers or servers over network 102.

In the example embodiment, user interface 112 may be a computer program that allows a user to interact with computing device 110 and other connected devices via network 102. For example, user interface 112 may be a graphical user interface (GUI). In addition to comprising a computer program, user interface 112 may be connectively coupled to hardware components, such as those depicted in FIG. 12, for receiving user input. In the example embodiment, user interface 112 is a web browser, however in other embodiments user interface 112 may be a different program capable of receiving user interaction and communicating with other devices.

With continued reference to FIG. 1, enterprise server 120 contains application programming interface (API) 122, and enterprise application 124, and may be a laptop computer, tablet computer, netbook computer, personal computer (PC), a desktop computer, a personal digital assistant (PDA), a smart phone, or any programmable electronic device capable of communicating with computing device 110 and server 130 via network 102. While enterprise server 120 is shown as a single device, in other embodiments, enterprise server 120 may be comprised of a cluster or plurality of computing devices, working together or working separately. Enterprise server 120 may be implemented in a cloud computing environment, as described in relation to FIGS. 13 and 14, herein.

In the example embodiment, API 122 refers to a set of clearly defined methods of communication between various software components, and may be for a web-based system, operating system, database system, computer hardware or software library. An API 122 specification can take many forms, but often includes specifications for routines, data structures, object classes, variables, or remote calls. Just as a graphical user interface (GUI) makes it easier for people to use programs, APIs make it easier for developers to use certain technologies in building applications. By abstracting the underlying implementation and only exposing objects or actions the developer needs, an API simplifies programming. In the exemplary embodiment, an enterprise application API may only expose the application's error schema and keep hidden the underlying code of the application. In this fashion, a micro-service is capable of obtaining, and using, the error schema code of every enterprise application, or its associated micro-services, without the need to know or understand the implementation details and complexities of the applications.

There are various APIs 122 known to one of ordinary skill in the art, which may include remote APIs or web APIs. A remote API allows developers to manipulate remote resources through protocols, regardless of language or platform. For example, the Java Database Connectivity API allows developers to query many different types of databases with the same set of functions, while the Java remote method invocation API uses the Java Remote Method Protocol to allow invocation of functions that operate remotely, but appear local to the developer.

A web API is a defined interface through which interactions occur between an enterprise and applications that use its assets. In an exemplary embodiment, a web API 122 is the defined interface through which an interaction happens between an enterprise application 124 and a micro-service 132, and may provide programmable interfaces for a set of services to different enterprise applications 124 serving different types of consumers. A web API may typically be defined as a set of Hypertext Transfer Protocol (HTTP) request messages, along with a definition of the structure of response messages, which is usually in an Extensible Markup Language (XML) or JavaScript Object Notation (JSON) format.

In the exemplary embodiment, enterprise application 124 refers to a software application that a business, or enterprise, may use to assist the organization in solving enterprise problems, and are typically designed to interface or integrate with other enterprise applications used within the enterprise. An enterprise application 124 communicates with a micro-service 132 via an API 122 to serve a business goal, for example, providing application error schema to a micro-service in order to enable seamless error handling. In an exemplary embodiment, multiple micro-services may comprise an enterprise application 124.

With continued reference to FIG. 1, server 130, in the example embodiment, may be a laptop computer, tablet computer, netbook computer, personal computer (PC), a desktop computer, a personal digital assistant (PDA), a smart phone, or any programmable electronic device capable of receiving and sending data to and from other computing devices. While server 130 is shown as a single device, in other embodiments, it may be comprised of a cluster or plurality of computing devices, working together or working separately. Server 130 may be implemented in a cloud computing environment, as described in relation to FIGS. 13 and 14, herein.

In the example embodiment, server 130 includes a micro-service 132 capable of communicating with enterprise application 124 via API 122. A micro-service 132, in the exemplary embodiment, may be a distinctive software modular service, as part of a service-oriented architecture (SOA) design, that runs a unique process and communicates with the enterprise application 124 through a well-defined, lightweight mechanism to serve a business goal. In the exemplary embodiment, each independently, small, modular service communicates with each other depending on the application's requirements. Some common examples include HTTP/ReST with JSON or Protbuf.

In the exemplary embodiment, micro-service 132 includes error standardization program 134 and database 139, both of which are stored on micro-service 132 or on a storage device of server 130 where micro-service 132 operates. Error standardization program 134 contains instruction sets, executable by a processor, which may be described using a set of functional modules.

In the exemplary embodiment, database 139 is a local database/storage used to store one or more error mapping objects, in accordance with one or more software architecture styles, generated by error standardization program 134 as a result of an error schema response from enterprise application 124. Database 139, in exemplary embodiments, may also store one or more resolved error objects, created based on an error response and its corresponding error mapping object. Stored error mapping objects and resolved error objects are capable of being retrieved by error standardization program 134 for future use in resolving enterprise application 124 errors as they arise in run-time.

With continued reference to FIG. 1, the functional modules of error standardization program 134 include error mapping module 136 and error handling module 138.

Figure 2:
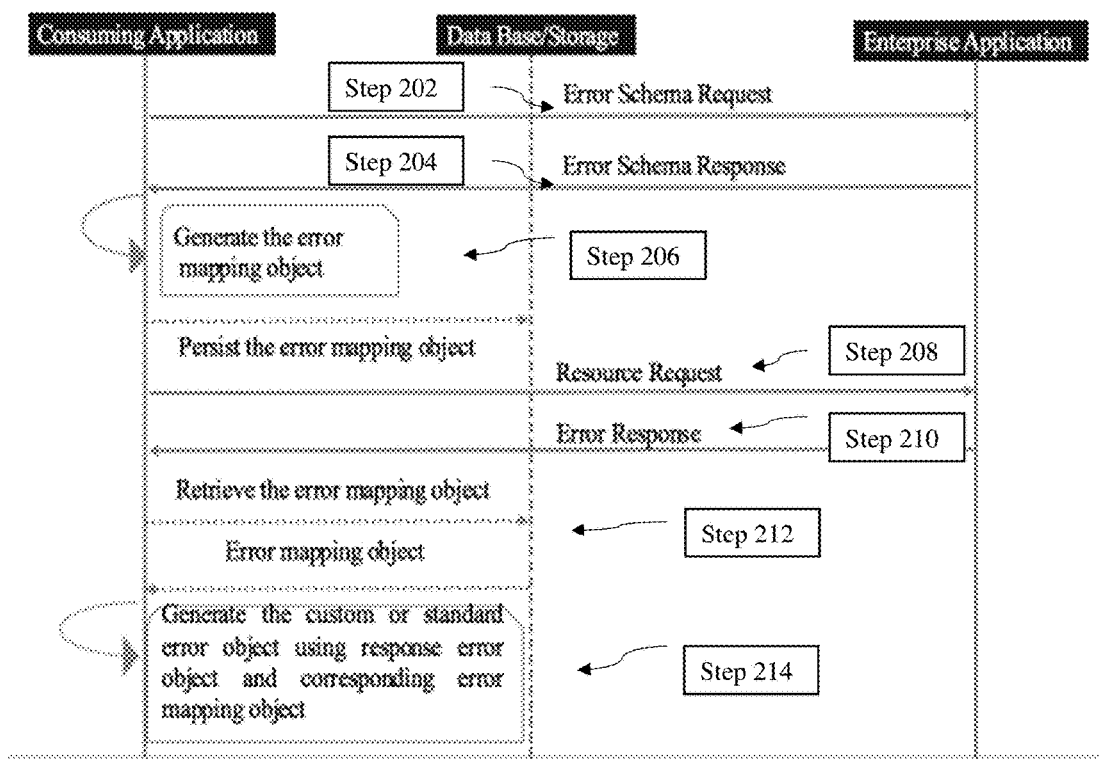
FIG. 2 is a flowchart that depicts the error schema discovery and eventual generation of custom or standard error objects, by micro-service 132 and its communication with enterprise application 124, according to an embodiment of the present invention.

FIG. 2 is a flowchart that depicts the error scheme discovery and eventual generation of custom or standard error objects, via the functional modules of error standardization program 134, by micro-service 132 (i.e. consuming application) and its communication with enterprise application 124, according to an embodiment of the present invention. The exemplary embodiment depicts error schema discovery during initialization/start-up. In alternative embodiments, error schema discovery may be obtained as an error occurs in real-time.

Referring now to FIGS. 1 and 2, error mapping module 136 includes a set of programming instructions in error standardization program 134. The set of programming instructions is executable by a processor. Error mapping module 136 requests an error schema definition for one or more error objects from enterprise application 124 (step 202). In an exemplary embodiment, error mapping module 136 communicates with enterprise application 124 via API 122 exposed. API 122 exposed means providing the user with an interface to access and manipulate representations of objects, in this case error objects, returned by enterprise application 124.

An error schema definition may include one or more error object structures, delineating the at least one error schema definition in various architecture styles, for various returned error messages for a given enterprise application 124. For example, the at least one error schema definition provided for a particular error object, by enterprise application 124, may contain a name specified for the "properties" of the particular error object, and further provide the name for the "properties" in various architecture styles (e.g. ReST, oDATA).

For example, with reference now to FIGS. 3 and 4, a JSON formatted error schema definition for "Bad Request", as defined by enterprise application #1 and enterprise application #2, wherein enterprise application #1 and enterprise application #2 represent software applications, are shown respectively. The example JSON formatted error schema definitions, in the exemplary embodiments, contain the details for "Bad Request" error type and its "properties," together with the name used to represent the "properties" in various commonly used architecture styles (e.g. ReST and oDATA).

For example, with reference to FIG. 3 specifically, the error schema definitions for the properties "code", "message", and "errors", in enterprise application #1, correspond to "statusCode", "message", and "errors", respectively, in ReST architecture style. Similarly, the error schema definitions for the properties "code", "message", and "errors", in enterprise application #1, correspond to "code", "message", and "errors_message", respectively, in oDATA architecture style.

Now, with reference to FIG. 4 specifically, the error schema definitions for the properties "status" and "message", in enterprise application #2, correspond to "statusCode", and "message", respectively, in ReST architecture style. Similarly, the error schema definitions for the properties "status" and "message", in enterprise application #2, correspond to "code" and "message", respectively, in oDATA architecture style.

In various embodiments, error schema definitions may include additional architecture style names, as defined by various enterprise applications 124.

In an exemplary embodiment, error mapping module 136 may request a batch of error schema definitions from enterprise application 124, or other micro-services, upon introduction or at start-up, in order to identify error mapping objects. In other embodiments, error mapping module 136 may add each error schema definition, from enterprise application 124, or other micro-services, as they arise in run-time. For example, when an error is returned from enterprise application 124, micro-service 132 can retrieve the error schema definitions associated with the error object via a request. In alternative embodiments, error mapping module 136 may check for new error schema definitions from enterprise application 124, or other micro-services, every time enterprise application 124 is updated.

Referring back to FIGS. 1 and 2, error mapping module 136 receives the at least one error schema definition from enterprise application 124 (step 204). Micro-service 132 is capable of receiving the at least one error schema definition from enterprise application 124 due to API 122 exposed, wherein the at least one error schema definition for the error type includes at least one generic property name. The underlying programming code, and its complexities, for the functioning of enterprise application 124 remains hidden from micro-service 132. The received at least one error schema definition, is used by micro-service 132 to generate an error mapping object, which can later be used to build a custom or standard error message at run-time while incorporating the "properties" of the actual response error object received from enterprise application 124.

Figures 5, 6:
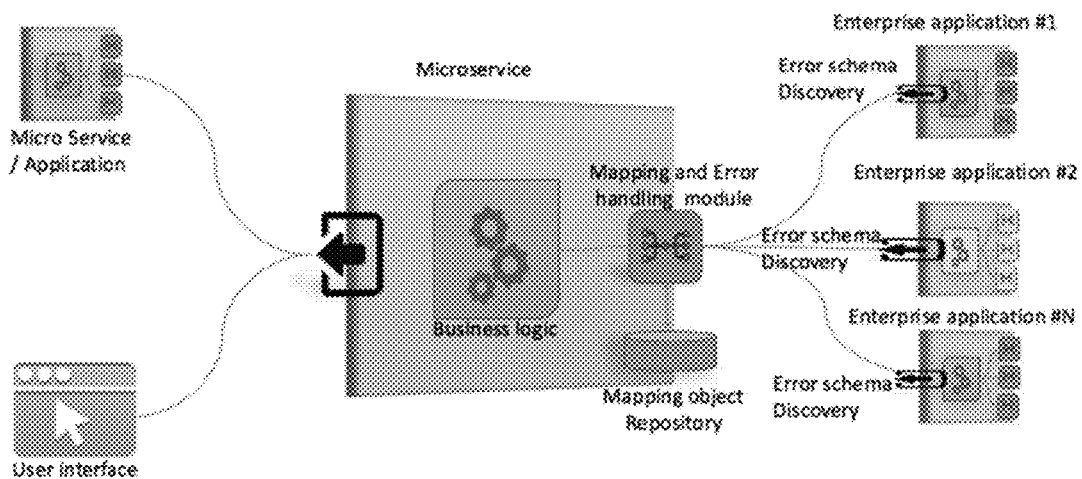
FIG. 5 is a diagram that depicts micro-service 132 discovering the error schema from enterprise applications #1-#N, according to an embodiment of the present invention.
FIG. 6 is an example of a generated error mapping object for "Bad Request" by error mapping module 136 of micro-service 132, according to an embodiment of the present invention.

With reference to FIG. 5, micro-service 132 is depicted interacting with various enterprise applications 124 (i.e. enterprise application #1-enterprise application #N) via respective APIs 122 exposed, wherein each enterprise application 124 defines its own error schema definitions for its respective error objects and communicates same to micro-service 132.

Referring back to FIGS. 1 and 2, error mapping module 136 generates an error mapping object using the received at least one error schema definition (step 206). An error mapping object is a data object containing a coded values framework for at least one error schema definition for an error type with a corresponding error schema definition of at least one architecture style, wherein the corresponding error schema definition of the at least one architecture style includes at least one architecture-specific property name, received from one or more enterprise applications 124. Micro-service 132 generates an error mapping object based on the discovered at least one error schema definition, for a particular error type (e.g. "Bad Request"), either before, or at the time of, receiving an error object from enterprise application 124. In other words, the generated error mapping object is capable of translating at least one error schema definition, from one or more enterprise applications 124, into a recognized error message received by micro-service 132. In order to accomplish this, the software developer may write software code that uses the discovered at least one error schema definition from the one or more enterprise applications 124 to generate the error mapping object, as further described below with reference to FIG. 6.

With reference to FIG. 6, a generated error mapping object for a "Bad Request" error object, in ReST architecture, is depicted. Other architectures may have corresponding mapping objects for a given error type; for example, the oDATA architecture may have a corresponding mapping object for a "Bad Request" error object.

In one exemplary embodiment, such as the embodiment depicted in FIG. 6, the error mapping object may have a set of mapped property pairs. Each mapped property pair may have at least two elements, separated by a colon: a first element derived from an architecture-specific property name, and a second element derived from a generic property name. Other structures and representations are possible. Both elements are derived from the error schema definitions for the given error type (FIG. 3) for which the error mapping object is to be generated.

For example, the error schema definitions for a "Bad Request" error type (FIG. 3) include architecture-specific property names for three generic property names of the "Bad Request" error type. Other error types may have their own sets of property names. The generic property names, in the given example, are "code", "message", and "errors". The architecture-specific property names corresponding to these generic properties, for the ReST architecture, are "statusCode", "message", and "errors". The architecture-specific property names corresponding to these generic property names, for the oDATA architecture, are "code", "message", and "errors_message".

Accordingly, for each mapped property pair of the generated error mapping object for a given error type, such as the generated error mapping object for a "Bad Request" error type, the element to the left of the colon is derived from an architecture-specific property name, and the element to the right of the colon is derived from the corresponding generic property name. In the example shown in FIG. 6, the element to the left is the architecture-specific property name (e.g., "statusCode", "message", "errors"), and the element to the right of the colon is a composite element having two words preceded by a "$" character, and separated by a "." character. The first word of the composite element to the right of the colon is the error title of the error type (e.g., "$error."), and the second word of the composite element to the right of the colon is the generic property name (e.g., "code", "message", or "errors"). This process can be used to generate the various mapped property pairs.

Figure 7:
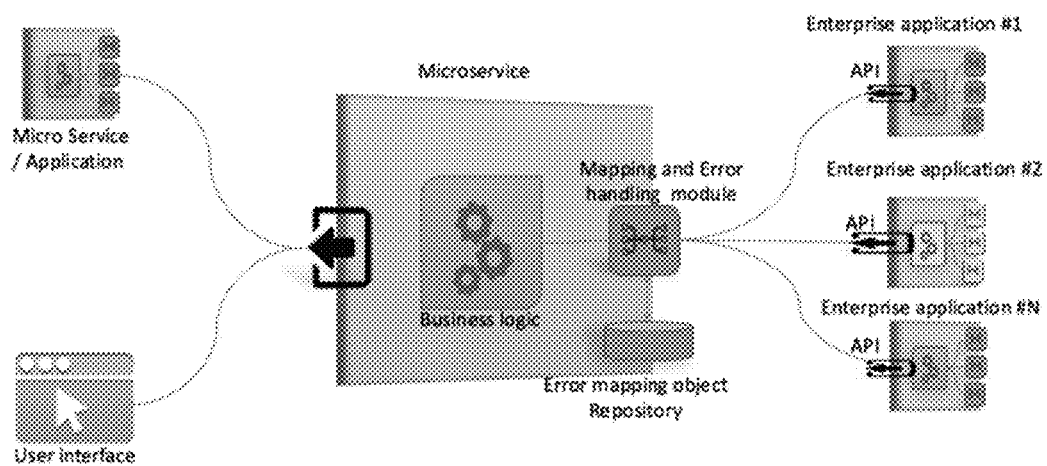
FIG. 7 is a diagram that depicts micro-service 132 interacting with applications #1-#N, using API 122, according to an embodiment of the present invention.

With reference to FIG. 7, micro-service 132 is depicted interacting with various enterprise applications 124 (i.e.

enterprise application #1-enterprise application #N) via respective APIs 122 exposed.

FIG. 8, for example, depicts an "HTTP/1.1 400 Bad Request" error object returned by enterprise application #1 when a user request is invalid. The error object returned contains specific "properties" in a specific structure, or format, unique to enterprise application #1.

FIG. 9 depicts the same "HTTP/1.1 400 Bad Request" error object, as in FIG. 8, returned by enterprise application #2 when a user request is invalid. Similar to the "Bad Request" error object in FIG. 8, the "Bad Request" error object also contains specific "properties" in a specific structure, or format, unique to enterprise application #2.

With reference to FIGS. 8 and 9, enterprise application #1 and enterprise application #2 are communicating the same response error object to the user (e.g. "HTTP/1.1 400 Bad Request"), only in a different architecture-specific style, using different error schema definitions. One example of a different error schema definition, in ReST format, returned by both enterprise application #1 and enterprise application #2 include: enterprise application #1 (FIG. 8) "Bad Request" error object defines statusCode as "code", while enterprise application #2 (FIG. 9) "Bad Request" error object defines statusCode as "status". Error mapping module 136 normalizes the definitions.

In an exemplary embodiment, error mapping module 136 uses the generated error mapping object to build a custom or standard error message at run-time by combining a received response error object (e.g. FIGS. 8 and 9) with its corresponding error mapping object (e.g. FIG. 6) in database 139.

In the exemplary embodiment, error mapping module 136 persists the generated error mapping object, based on enterprise application's 124 error schema definitions, in database 139 for later reference and use. Error mapping module 136 may override, or replace, the generated error mapping object with an updated version, in the event an enterprise application's 124 error schema definition changes pursuant to new coding, updates, etc.

For example, FIG. 6 maps the error schema discovery for "HTTP/1.1 400 Bad Request" with reference to the response error object of FIG. 8. The information, or definitions, from enterprise application #1's error object depicted in FIG. 8 may be translated within the generated error mapping object of FIG. 6 by applying the corresponding definitions of FIG. 8 with the definitions of the generated error mapping object (i.e. "statusCode", "message", and "errors"). Based on the generated error mapping object, micro-service 132 is capable of applying the same mapping to future error responses of the same type and architecture (i.e. "HTTP/1.1 400 Bad Request" in this example), from the same enterprise application #1 using the same architecture style, as they arise.

In the exemplary embodiment, an enterprise application 124 that includes ReST architecture may return an error object that contains a value of "statusCode" in "code" property, whereas an enterprise application 124 that includes oData architecture may return an error object that contains a value of "code" in "code" property. The generated error mapping object normalizes the various code definitions across various architecture styles.

Referring back to FIGS. 1 and 2, micro-service 132 requests a resource from enterprise application 124 (step 208). The resource request may include an instruction or an action to be taken by enterprise application 124, such as retrieving, copying, accounting, managing, performing a task, etc. The fundamental concept in any API 122 (i.e. ReST or oData architecture) is the resource. A resource is an object with a type, associated data, relationships to other resources, and a set of methods that operate on it. A resource is similar to an instance of an "object" in an object-oriented programming language, with the important difference being that only a few standard methods are defined for the resource (e.g. corresponding to the standard HTTP "GET", "POST", "PUT", and "DELETE" methods), while an "object" instance typically has many methods.

In response to the resource request, micro-service 132 may receive an error response from enterprise application 124 (step 210). For example, the response error object may appear like the "HTTP/1.1 400 Bad Request", as depicted in FIGS. 8 and 9.

Figures 10, 11:
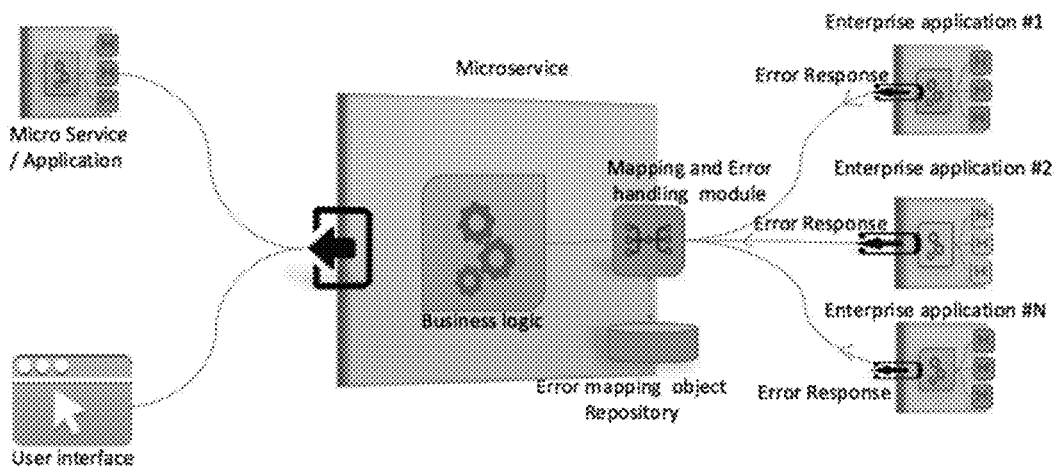
FIG. 10 is a diagram that depicts micro-service 132, via error handling module 138, receiving an error response from enterprise applications #1-#N, according to an embodiment of the present invention.
FIG. 11 is an example of a standardized error object generated by error handling module 138 of micro-service 132, according to an embodiment of the present invention.

With reference to FIG. 10, various enterprise applications 124 are depicted communicating an error response to micro-service 132, as a result of an invalid resource request. These invalid resource requests, and corresponding error responses, may occur individually or altogether. Micro-service 132 is capable of handling multiple errors, from more than one enterprise application 124, during run-time.

Referring back to FIGS. 1 and 2, error handling module 138 includes a set of programming instructions in error standardization program 134. The set of programming instructions is executable by a processor. Error handling module 138, in an exemplary embodiment, retrieves a corresponding error mapping object from database 139, based on the particular error response from enterprise application 124 (step 212). Error handling module 138 resolves the "properties" of the received response error object by translating the actual "properties" definitions with their corresponding "properties" definitions of various architecture styles (i.e. "statusCode": "$error.code", "message": "$error.message", "errors": "$error.errors") as determined by the retrieved error mapping object, stored in database 139.

With continued reference to FIGS. 1 and 2, error handling module 138 generates a resolved error object, based on the received response error object and its corresponding error mapping object (step 214). In the exemplary embodiment, the resulting resolved error object is displayed to the user in order to enhance the user experience, or responds to the initial resource request. In exemplary embodiments, the resolved error object may be a standard error object or a custom error object.

For example, with continued reference to the example "HTTP/1.1 400 Bad Request" error response of enterprise application #1 (FIG. 8), the resolved error object incorporates the actual definitions of the response error object with the corresponding, or translated, definitions of the architecture style of the generated error mapping object.

With reference to FIG. 11, error handling module 138 incorporates the "HTTP/1.1 400 Bad Request" response error object, from FIG. 8, together with its corresponding error mapping object stored in database 139, to generate a standard or custom error object. The resulting error object depicts the translated error schema definitions of "HTTP/1.1 400 Bad Request" in a generic snippet of code. The resulting normalized values, from FIG. 8, incorporated within the generated error mapping object, of FIG. 6, yields the resolved error object depicted in FIG. 11.

With continued reference to FIGS. 1 and 2, the following exemplary embodiments are disclosed herein. A computer-implemented method for error standardization that includes receiving at least one error schema definition for an error type from a software application, wherein the at least one error schema definition for the error type includes at least one generic property name. The method further includes mapping the received at least one error schema definition with a corresponding error schema definition of at least one architecture style, wherein the corresponding error schema definition of the at least one architecture style includes at least one architecture-specific property name. The method further includes generating an error mapping object based on the mapping of the received at least one error schema definition and the corresponding error schema definition of the at least one architecture style, receiving an error object from the software application, and generating a resolved error object, for the received error object, based on the generated error mapping object.

The computer-implemented method for error standardization, wherein generating a resolved error object includes mapping the received at least one error schema definition of the received error object from the software application to a standardized error schema definition based on the at least one architecture style, and assigning one or more values of the received error object to the corresponding error schema definition of the generated error mapping object.

The computer-implemented method for error standardization, further including updating the generated error mapping object based on changes to the received at least one error schema definition of the received error object.

The computer-implemented method for error standardization, wherein the generated error mapping object for the received error object represents a set of mapped property pairs comprising at least two elements, wherein a first element is derived from the at least one architecture-specific property name of the at least one error schema definition for the error type, and a second element is derived from the at least one generic property name of the at least one error schema definition for the error type.

The computer-implemented method for error standardization, further including requesting the at least one error schema definition by a micro-service.

The computer-implemented method for error standardization, further including receiving the at least one error schema definition for the received error object, by a micro-service, in response to a resource request.

The computer-implemented method for error standardization, further including retrieving one or more generated mapping objects based on the received error object from one or more software applications at the same time.

Figure 12:
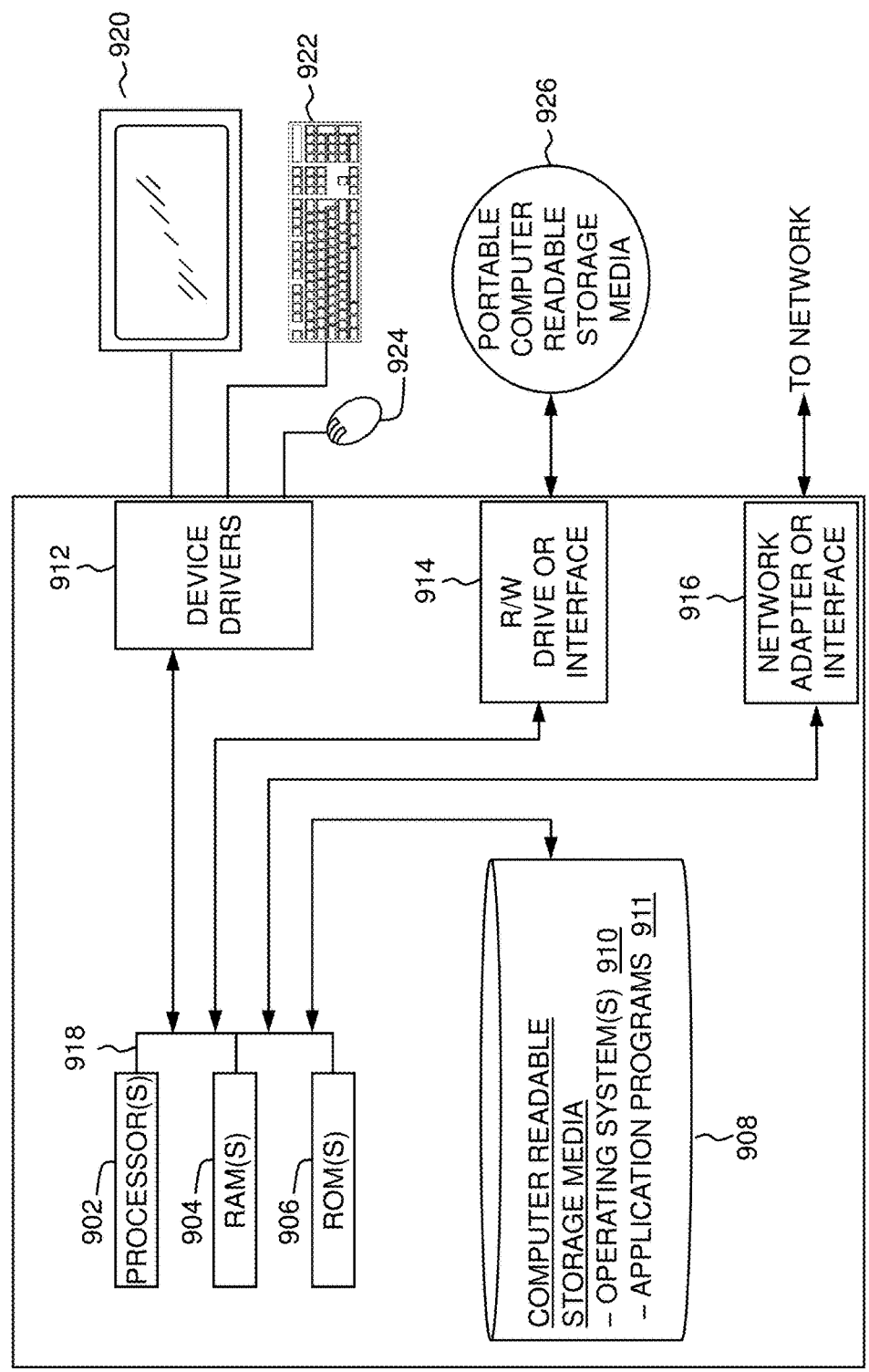
FIG. 12 is a diagram graphically illustrating the hardware components of a computing environment of FIG. 1, in accordance with an embodiment of the present invention.

FIG. 12 is a block diagram depicting components of a computing device in accordance with an embodiment of the present invention. It should be appreciated that FIG. 12 provides only an illustration of one implementation and does not imply any limitations with regard to the environments in which different embodiments may be implemented. Many modifications to the depicted environment may be made.

Computing device of FIG. 12 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as error standardization program 134, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 12 may also include a R/W drive or interface 914 to read from and write to one or more portable computer readable storage media 926. Application programs 911 on computing device 110 may be stored on one or more of the portable computer readable storage media 926, read via the respective R/W drive or interface 914 and loaded into the respective computer readable storage media 908.

Computing device of FIG. 12 may also include a network adapter or interface 916, such as a TCP/IP adapter card or wireless communication adapter (such as a 4G wireless communication adapter using OFDMA technology). Application programs 911 on computing device of FIG. 12 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 12 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
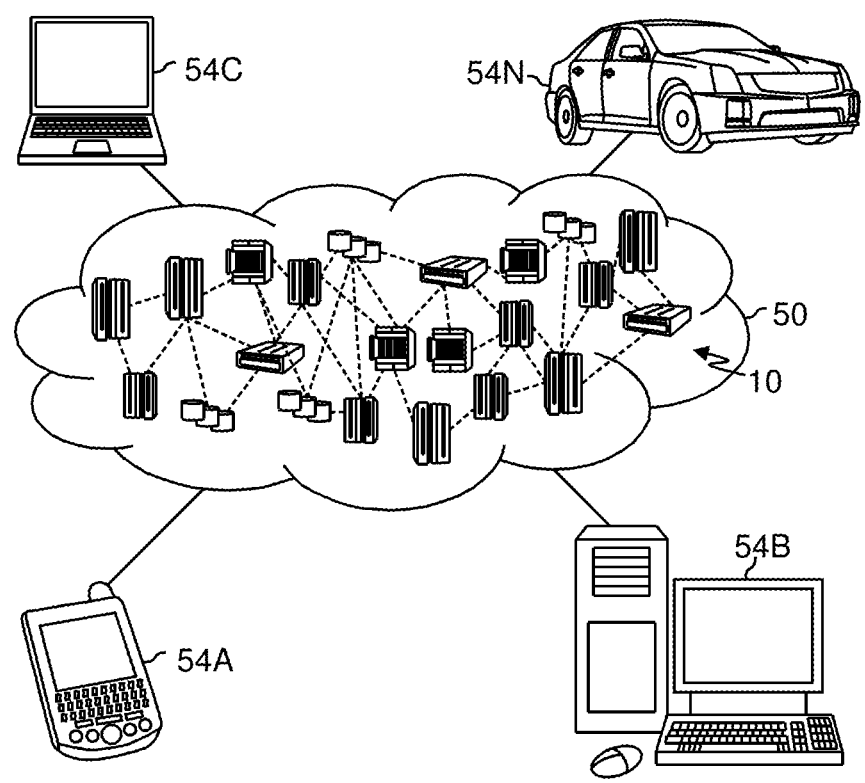
FIG. 13 depicts a cloud computing environment, in accordance with an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
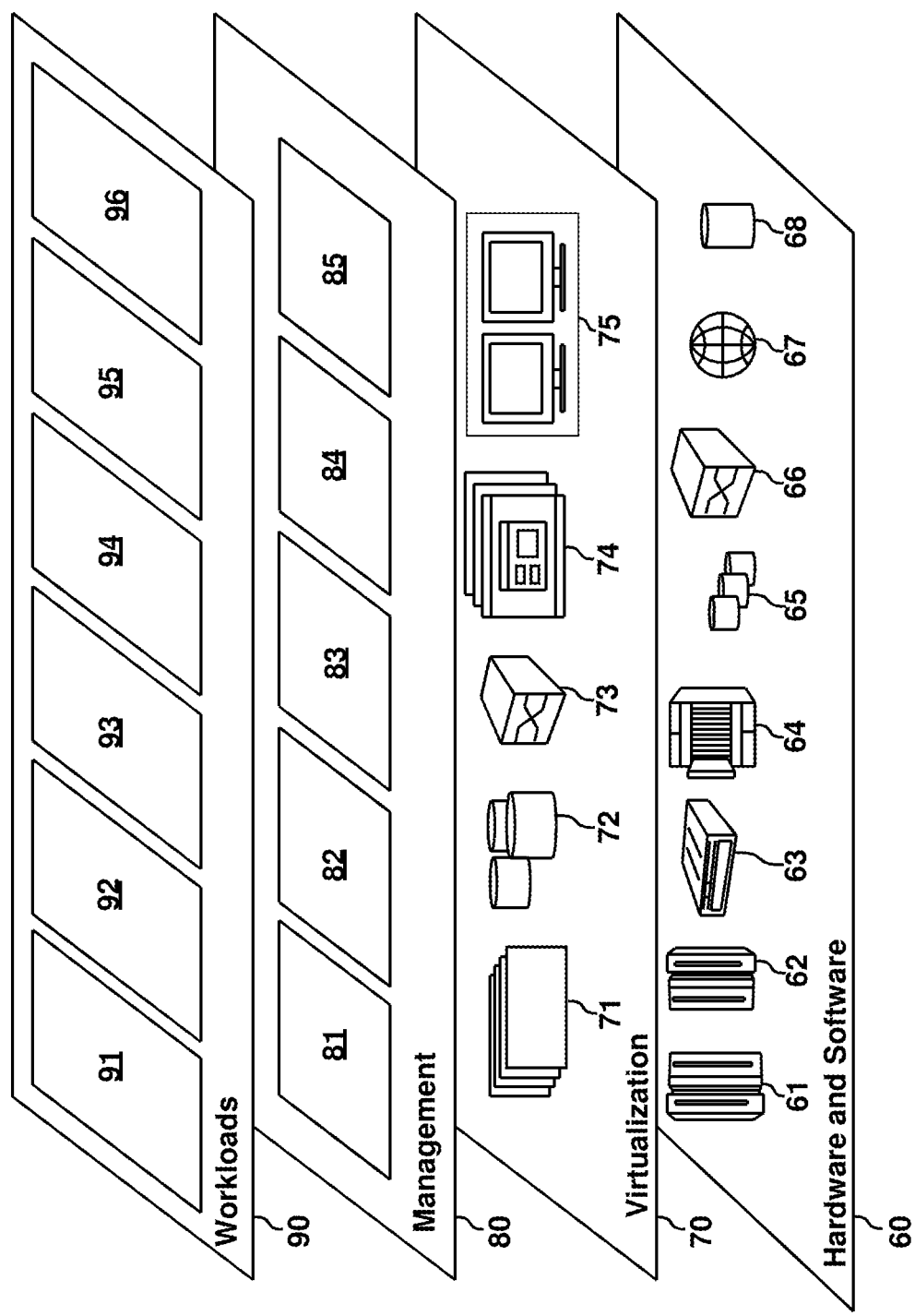
FIG. 14 depicts abstraction model layers of the illustrative cloud computing environment of FIG. 13, in accordance with an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; analytics services 96, including those described in connection with FIGS. 1-13.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for error standardization, the method comprising:
   receiving at least one error schema definition for an error type from a software application,
      wherein the at least one error schema definition for the error type includes at least one generic property name;
   mapping the received at least one error schema definition with a corresponding error schema definition of at least one architecture style,
      wherein the corresponding error schema definition of the at least one architecture style includes at least one architecture-specific property name;
   generating an error mapping object based on the mapping of the received at least one error schema definition and the corresponding error schema definition of the at least one architecture style;
   receiving an error object from the software application; and
   generating a resolved error object, for the received error object, based on the generated error mapping object.

2. The computer-implemented method of claim 1, wherein generating a resolved error object comprises:
   mapping the received at least one error schema definition of the received error object from the software application to a standardized error schema definition based on the at least one architecture style; and
   assigning one or more values of the received error object to the corresponding error schema definition of the generated error mapping object.

3. The computer-implemented method of claim 1, further comprising:
   updating the generated error mapping object based on changes to the received at least one error schema definition of the received error object.

4. The computer-implemented method of claim 1, wherein the generated error mapping object for the received error object represents a set of mapped property pairs comprising at least two elements, wherein
   a first element is derived from the at least one architecture-specific property name of the at least one error schema definition for the error type, and
   a second element is derived from the at least one generic property name of the at least one error schema definition for the error type.

5. The computer-implemented method of claim 1, further comprising:
   requesting the at least one error schema definition by a micro-service.

6. The computer-implemented method of claim 1, further comprising:
   receiving the at least one error schema definition for the received error object, by a micro-service, in response to a resource request.

7. The computer-implemented method of claim 1, further comprising:
   retrieving one or more generated mapping objects based on the received error object from one or more software applications at the same time.

8. A computer program product, comprising a non-transitory tangible storage device having program code embodied therewith, the program code executable by a processor of a computer to perform a method, the method comprising:
   receiving, by the processor, at least one error schema definition for an error type from a software application,
      wherein the at least one error schema definition for the error type includes at least one generic property name;
   mapping, by the processor, the received at least one error schema definition with a corresponding error schema definition of at least one architecture style,
      wherein the corresponding error schema definition of the at least one architecture style includes at least one architecture-specific property name;
   generating, by the processor, an error mapping object based on the mapping of the received at least one error schema definition and the corresponding error schema definition of the at least one architecture style;
   receiving, by the processor, an error object from the software application; and
   generating, by the processor, a resolved error object, for the received error object, based on the generated error mapping object.

9. The computer program product of claim 8, wherein generating a resolved error object comprises:
   mapping, by the processor, the received at least one error schema definition of the received error object from the software application to a standardized error schema definition based on the at least one architecture style; and
   assigning, by the processor, one or more values of the received error object to the corresponding error schema definition of the generated error mapping object.

10. The computer program product of claim 8, further comprising:
   updating, by the processor, the generated error mapping object based on changes to the received at least one error schema definition of the received error object.

11. The computer program product of claim 8, wherein the generated error mapping object for the received error object represents a set of mapped property pairs comprising at least two elements, wherein
   a first element is derived from the at least one architecture-specific property name of the at least one error schema definition for the error type, and
   a second element is derived from the at least one generic property name of the at least one error schema definition for the error type.

12. The computer program product of claim 8, further comprising:
   requesting, by the processor, the at least one error schema definition by a micro-service.

13. The computer program product of claim 8, further comprising:
   receiving, by the processor, the at least one error schema definition for the received error object, by a micro-service, in response to a resource request.

14. The computer program product of claim 8, further comprising:
   retrieving, by the processor, one or more generated mapping objects based on the received error object from one or more software applications at the same time.

15. A computer system, comprising:
one or more computer devices each having one or more processors and one or more tangible storage devices; and
a program embodied on at least one of the one or more storage devices, the program having a plurality of program instructions for execution by the one or more processors, the plurality of program instructions comprising instructions for:
   receiving, by the computer, at least one error schema definition for an error type from a software application,
      wherein the at least one error schema definition for the error type includes at least one generic property name;
   mapping, by the computer, the received at least one error schema definition with a corresponding error schema definition of at least one architecture style,
      wherein the corresponding error schema definition of the at least one architecture style includes at least one architecture-specific property name;
   generating, by the computer, an error mapping object based on the mapping of the received at least one error schema definition and the corresponding error schema definition of the at least one architecture style;
   receiving, by the computer, an error object from the software application; and
   generating, by the computer, a resolved error object, for the received error object, based on the generated error mapping object.

16. The computer system of claim 15, wherein generating a resolved error object comprises:
   mapping, by the computer, the received at least one error schema definition of the received error object from the software application to a standardized error schema definition based on the at least one architecture style; and
   assigning, by the computer, one or more values of the received error object to the corresponding error schema definition of the generated error mapping object.

17. The computer system of claim 15, further comprising:
   updating, by the computer, the generated error mapping object based on changes to the received at least one error schema definition of the received error object.

18. The computer system of claim 15, wherein the generated error mapping object for the received error object represents a set of mapped property pairs comprising at least two elements, wherein
   a first element is derived from the at least one architecture-specific property name of the at least one error schema definition for the error type, and
   a second element is derived from the at least one generic property name of the at least one error schema definition for the error type.

19. The computer system of claim 15, further comprising:
   requesting, by the computer, the at least one error schema definition by a micro-service.

20. The computer system of claim 15, further comprising:
   receiving, by the computer, the at least one error schema definition for the received error object, by a micro-service, in response to a resource request.

* * * * *